United States Patent
Gallagher et al.

(10) Patent No.: US 7,276,873 B2
(45) Date of Patent: Oct. 2, 2007

(54) FAULT-HANDLING SYSTEM FOR ELECTRIC POWER STEERING SYSTEM

(75) Inventors: Thomas James Gallagher, Lake Orion, MI (US); Hong Jiang, Lake Orion, MI (US); Sergei Kolomeitsev, Rochester, MI (US); John R. Suriano, Auburn Hills, MI (US); Joseph P. Whinnery, Pontiac, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 502 days.

(21) Appl. No.: 10/698,574

(22) Filed: Oct. 31, 2003

(65) Prior Publication Data

US 2005/0093499 A1    May 5, 2005

(51) Int. Cl.
*H02P 1/00* (2006.01)
*H02P 3/00* (2006.01)
*H02P 7/06* (2006.01)
*H02P 23/00* (2006.01)
*H02P 27/00* (2006.01)

(52) U.S. Cl. ........................ 318/495; 318/747
(58) Field of Classification Search ............... None
See application file for complete search history.

(56) References Cited

U.S. PATENT DOCUMENTS

| | | |
|---|---|---|
| 3,560,818 A | 2/1971 | Amato |
| 4,655,099 A | 4/1987 | Hansen |
| 4,896,089 A * | 1/1990 | Kliman et al. ............... 318/701 |
| 5,134,349 A | 7/1992 | Kruse |
| 5,202,613 A | 4/1993 | Kruse |
| 5,206,571 A | 4/1993 | Burri |
| 5,321,342 A | 6/1994 | Kruse |
| 5,672,944 A | 9/1997 | Gokhale et al. |
| 5,757,596 A | 5/1998 | Weber et al. |
| 5,855,195 A | 1/1999 | Oikawa et al. |
| 5,998,929 A | 12/1999 | Bechtel et al. |
| 6,196,078 B1 | 3/2001 | DeJonge et al. |
| 6,211,631 B1 * | 4/2001 | Wilson-Jones et al. ....... 318/12 |
| 6,266,591 B1 | 7/2001 | Wilson-Jones et al. |
| 6,307,338 B1 | 10/2001 | Kuner et al. |
| 6,320,731 B1 | 11/2001 | Eaves et al. |

(Continued)

OTHER PUBLICATIONS

Gopalarathnam T et al: "Multi-Phase Fault-Tolerant Brushless DC Motor Drives" Conference Record of the 2000 IEEE Industry Applications Conference. 35th IAS Annual Meeting and World Conference on Industrial Applications of Electrical Energy. Rome, Italy, Oct. 8-12, 2000, Conference Record of the IEEE Industry Applications Conference IAS Annual Meeting, New York, NY: IEEE, US-ISBN 0-7803-6402-3, vol: 3 of 5. Conf. 35, Oct. 8, 2000 (Oct. 8, 2000), pp. 1683-1688, XP001043278.

*Primary Examiner*—Lincoln Donovan
*Assistant Examiner*—Erick Glass
(74) *Attorney, Agent, or Firm*—Jacox, Meckstroth & Jenkins

(57) ABSTRACT

A fault-handling system for a 2-phase motor. When an electric motor is used for power assist in a steering system in a vehicle, malfunctions can cause loss of assist, and detectable vibration. The invention utilizes a 2-phase motor in such an application, and implements alternate modes of operation when certain malfunctions occur, thereby maintaining the assist function in situations wherein the function would otherwise be lost or reduced.

41 Claims, 11 Drawing Sheets

U.S. PATENT DOCUMENTS

| | | |
|---|---|---|
| 6,326,750 B1 | 12/2001 | Marcinkiewicz |
| 6,331,757 B1 | 12/2001 | Makaran |
| 6,351,091 B1 | 2/2002 | Heinkel et al. |
| 6,359,401 B1 | 3/2002 | Garcia-Sinclair et al. |
| 6,465,973 B1 | 10/2002 | Kato et al. |
| 6,691,817 B2 * | 2/2004 | Wilson-Jones ............. 180/404 |
| 6,803,847 B2 * | 10/2004 | Burse ......................... 336/173 |
| 2001/0019210 A1 | 9/2001 | Fukasaku et al. |
| 2003/0057903 A1 | 3/2003 | Desbiolles et al. |
| 2003/0057908 A1 | 3/2003 | Kusaka et al. |

* cited by examiner

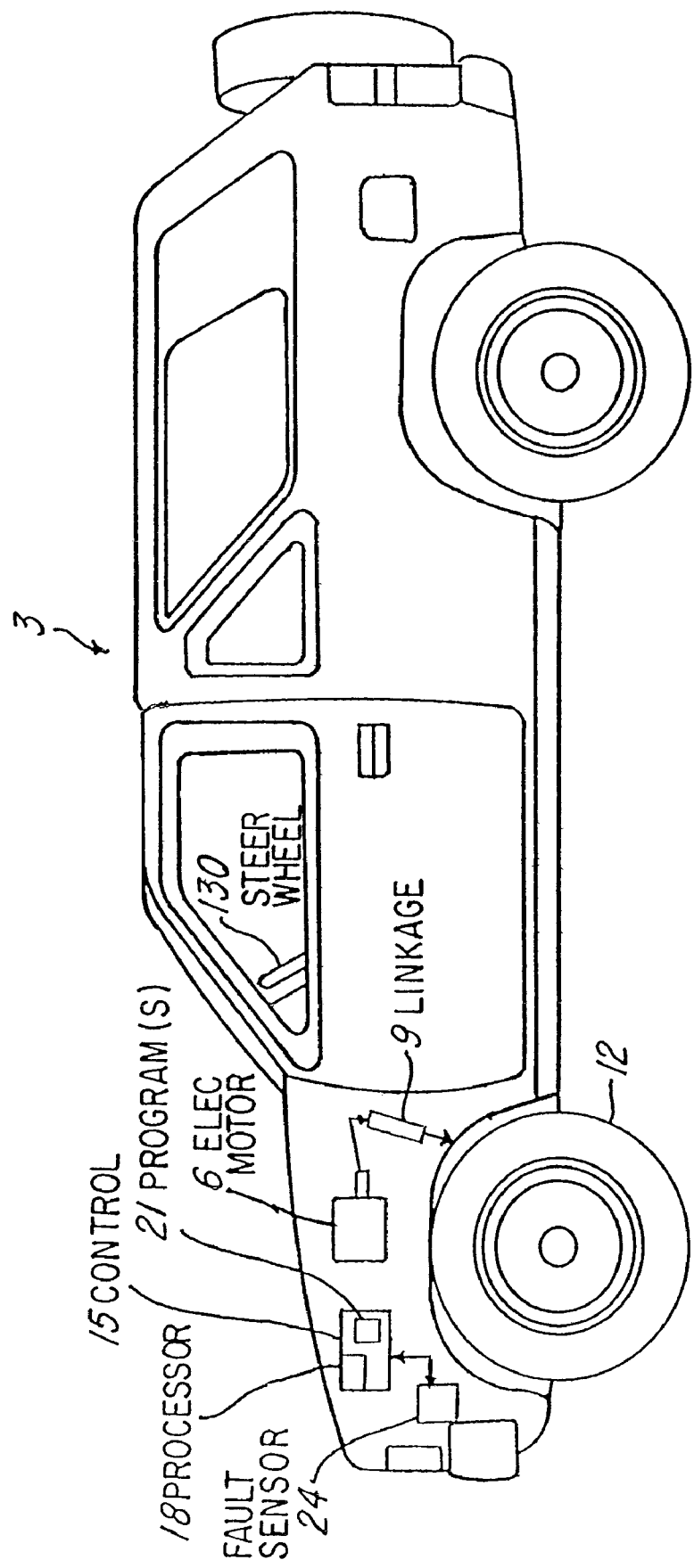
FIG—1

CONTINUE OPERATION

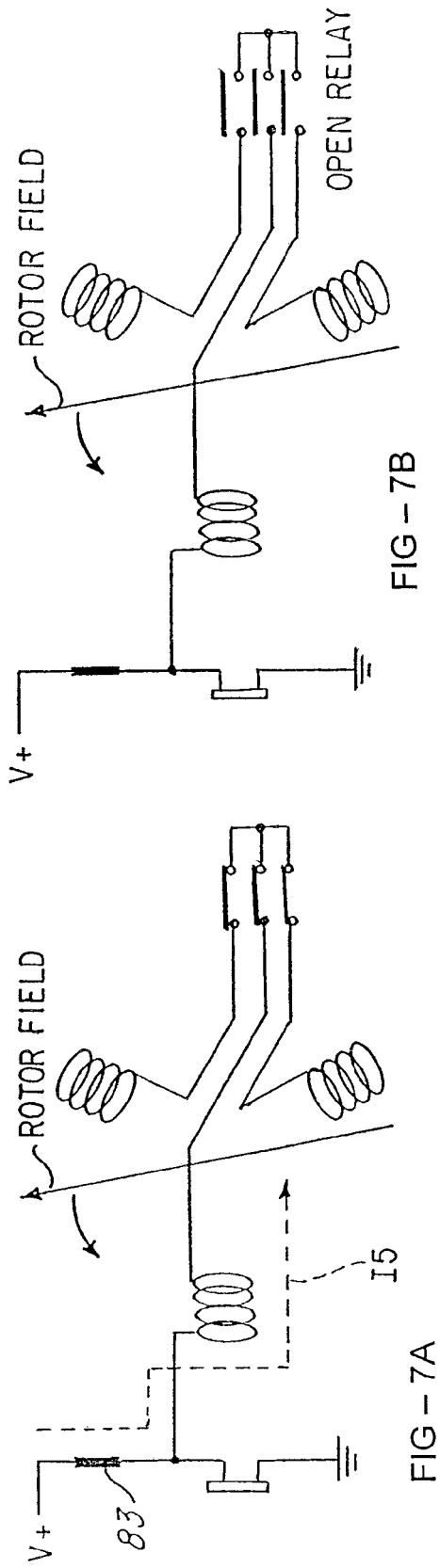
FIG-7A
FIG-7B
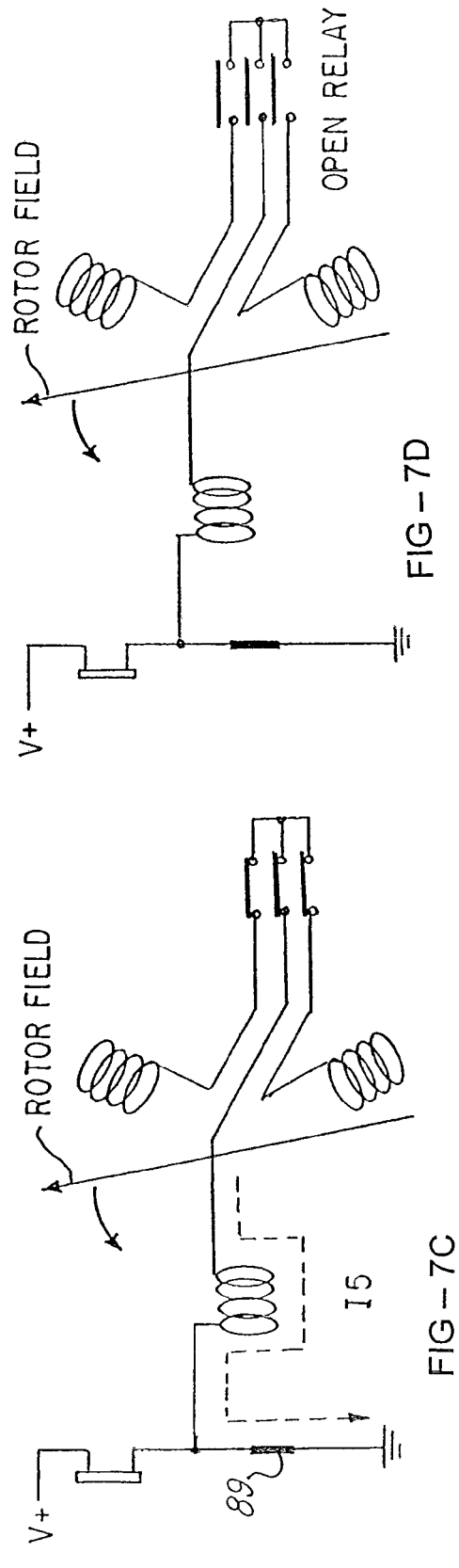
FIG-7C
FIG-7D

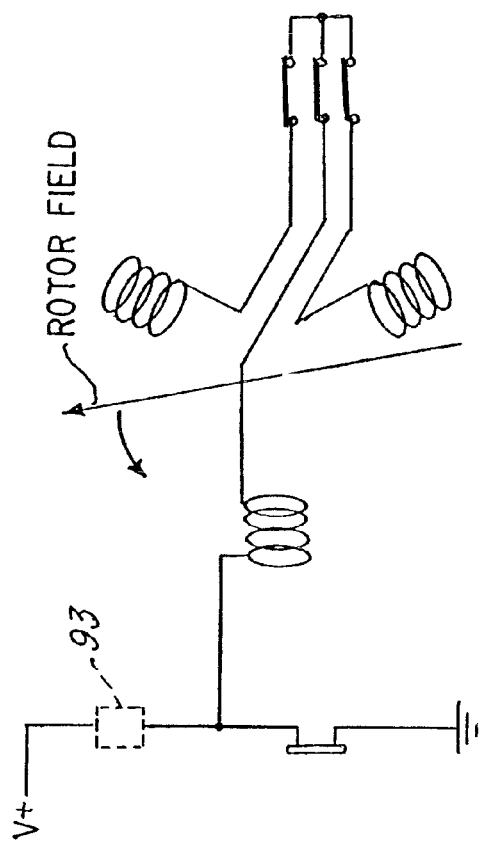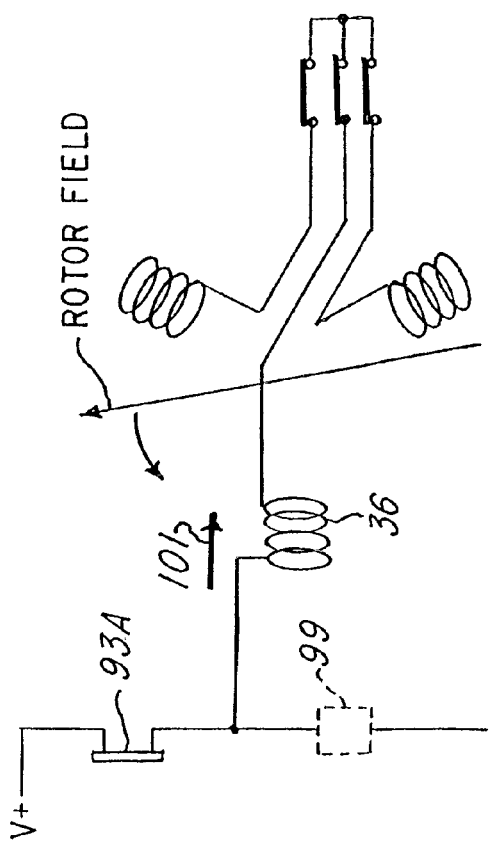

FAULT-HANDLING SYSTEM FOR ELECTRIC POWER STEERING SYSTEM

This application is related to an application entitled "Electric Power System for a Vehicle," which is concurrently filed herewith on Oct. 31, 2003, and which is hereby incorporated by reference.

The invention relates to electric power-steering systems in vehicles, and to approaches for handling malfunctions which may occur in such systems.

BACKGROUND OF THE INVENTION

Modern electric motors, while extremely reliable, are nevertheless not perfect. They can experience malfunctions, particularly after they have been in service for extended periods of time, and especially if they have experienced abusive operation.

When an electric motor is used in a power steering system in a vehicle, a malfunction can cause loss of the power assist which the motor otherwise provides. The invention provides approaches to detecting malfunctions, and taking corrective action.

OBJECTS OF THE INVENTION

An object of the invention is to provide an improved power steering system in a vehicle.

SUMMARY OF THE INVENTION

In one form of the invention, a short is detected across a coil in a stator of a motor, and current is terminated to that coil.

BRIEF DESCRIPTION OF THE DRAWINGS

FIG. 1 illustrates a vehicle 3 in which one form of the invention is installed.

FIGS. 7A, 7B, 7B, and 7D illustrate shorts in two transistors 83 or 89 in a circuit which drives a coil in the three-phase stator, and a response taken to the short.

FIGS. 8A and 8B illustrate open circuits in two transistors 93 or 99 in a circuit which drives a coil in the three-phase stator, and a response taken to the open circuit.

FIG. 10 illustrates how the transistors are switched on and off in each quadrant of operation of the motor. Quadrants I, II, III, and IV refer to the angular position of a reference on the rotor of the motor.

FIG. 11 illustrators

DETAILED DESCRIPTION OF THE INVENTION

Figure 3:
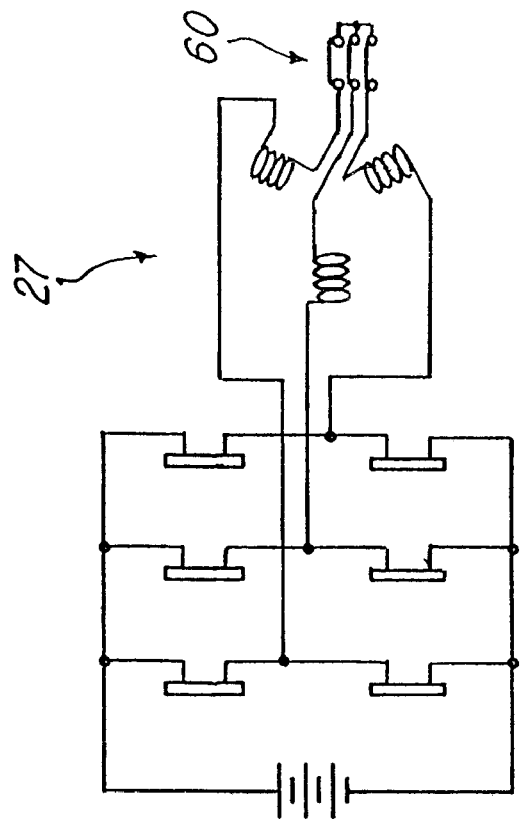
FIG. 3 illustrates a relay 60 added to the stator of FIG. 2.

FIG. 1 illustrates a motor vehicle 3, which contains an electric motor 6, and a linkage 9 connecting between the motor 6 and the steerable wheels 12. Such linkages 9 are well-known.

Also shown is a control system 15, which implements processes utilized by the invention. The control system includes a microprocessor 18, which runs one or more programs 21. A fault-diagnostic system 24 measures various voltages and currents in the motor 6 and associated components, and possibly other parameters such as motor speed. The diagnostic system 24 then either (1) infers the presence of certain malfunctions and transmits data indicating the malfunctions to the control 15 or (2) delivers data indicating the voltages, currents, and parameters to the control 15, allowing the latter to infer malfunctions, or (3) some combination of (1) and (2).

In response to detection of malfunctions, the control system 15 takes corrective actions. This discussion will discuss corrective actions which may be taken in a system powered by a 3-phase motor, and then corrective actions which may be taken in a system powered by a 2-phase motor.

Figure 2:
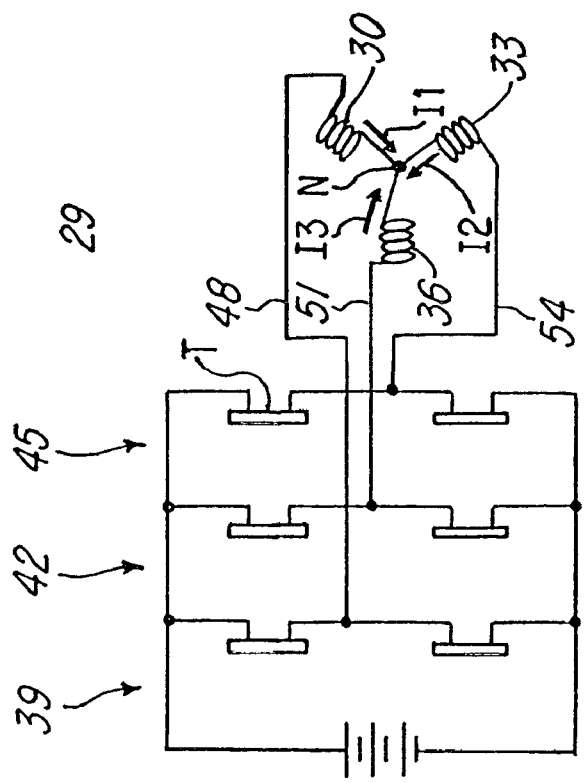
FIG. 2 is a schematic of a stator in a 3-phase motor.

FIG. 2 is a schematic of the stator 27 of a 3-phase motor, which stator contains coils, or phases, 30, 33, and 36. Switches 39, 42, and 45 control currents to the phases. Blocks T represent transistors. A significant feature is that, because of Kirchoff's Current Law, the three currents I1, I2, and I3 in the coils must sum to zero. That is, the three currents I1, I2, and I3 are not independent: once two currents are specified, or generated, they determine the third.

If the motor of FIG. 2 is used in a motor vehicle, the neutral point N often remains unconnected. That is, only three wires 48, 51, and 54 enter the housing (not shown) of the motor. No neutral wire enters the housing.

In some situations, a relay 60 in FIG. 3 can be provided. In certain situations, the relay 60 is opened, thereby terminating operation of the motor. Various situations in which this termination may occur will now be discussed.

Figure 4:
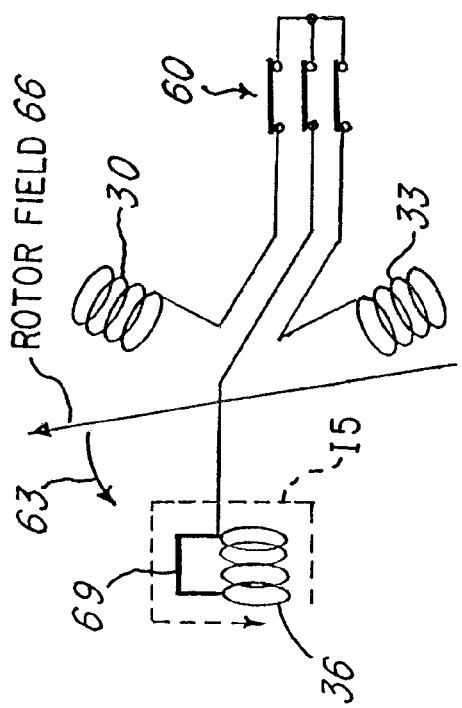
FIG. 4 illustrates a short across coil 36 in the 3-phase stator, and a response taken to the short.

FIG. 4 shows the three coils 30, 33, and 36, which individually produce three magnetic fields (not shown), which add vectorially to produce a rotating magnetic field, called the stator field, which rotates in the direction of arrow 63.

The rotor (not shown) of the motor is equipped with its own magnetic field 66, and, because of the laws of physics, the rotor field 66 attempts to align itself with the rotating stator field, thereby causing the rotor to rotate.

If coil 36 should become shorted, as by a connection 69 occurring between its two ends, or a connection (not shown)

which shorts a significant number of the turns, then an undesirable event can occur within coil 36. When the rotating rotor field 66 crosses the now-shorted coil 36, it generates a short-circuit current IS. That current passes through the internal resistance of the coil 36, thereby generating heat, and absorbing energy from the rotating rotor field 66. This energy absorption creates a drag on the rotor. Explained another way, the rotating field of the rotor generates a voltage in the short-circuited coil which produces current through the short, and hence torque which opposes motion much as in a synchronous generator.

One response to detection of the short 69 is to continue operation in the usual manner. The two remaining coils 30 and 33 provide a type of rotating stator field, which is effective to continue to rotate the rotor, but in the presence of the drag just discussed.

Figure 5B:
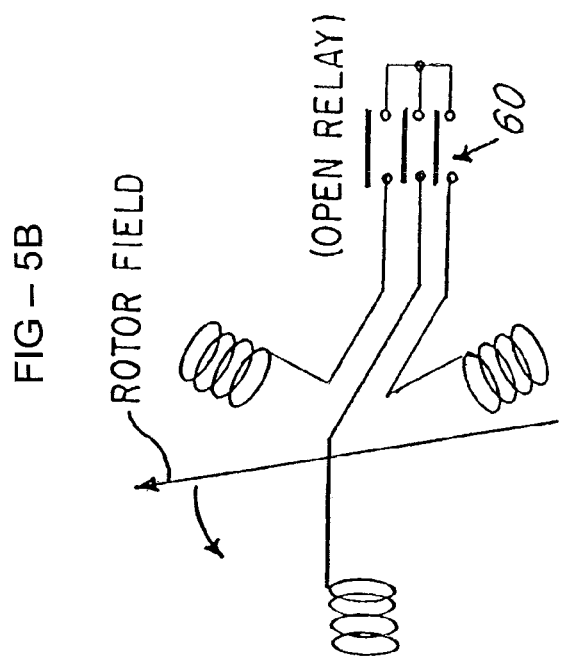
FIGS. 5A and 5B illustrate a short between coils 36 and 33 in the 3-phase stator, and a response taken to the short.
Figure 5A:
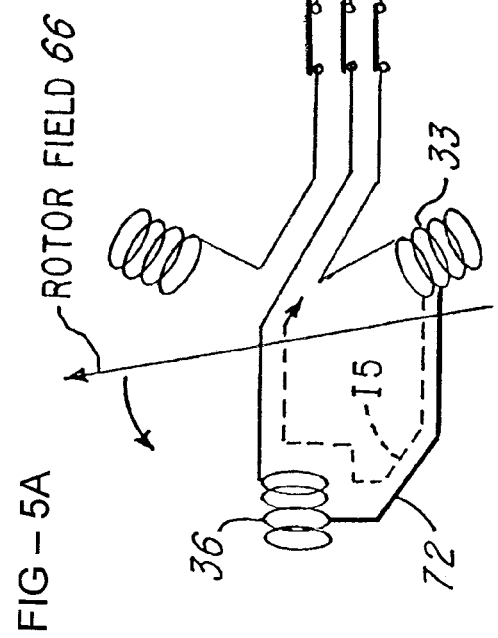

FIG. 5A illustrates another type of fault, wherein a short 72 occurs between two coils 33 and 36. Again, the rotating rotor field will generate short-circuit current IS, causing a drag on the rotor. When this type of fault is detected, a control system (not shown) opens the relay 60, as indicated in FIG. 5B. Now current IS is terminated, as is operation of the motor. If the motor were used in a power steering system, the power assist of the motor would, of course, terminate.

Figure 6B:
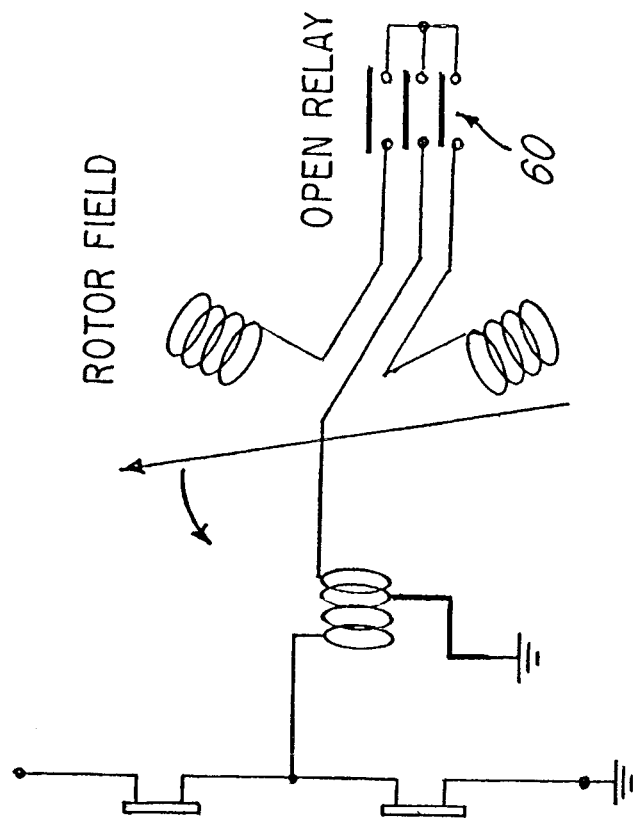
FIGS. 6A and 6B illustrate a short between coil 36 and ground in the 3-phase stator, and a response taken to the short.
Figure 6A:
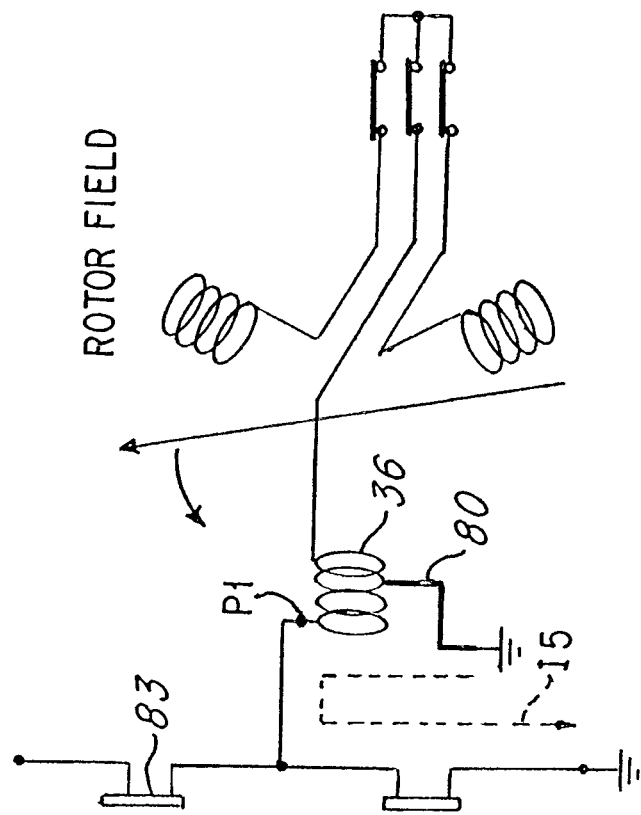

FIG. 6 illustrates a short 80 between a coil 36 and ground. This fault will cause a short-circuit current IS, and drag on the rotor, as discussed above. In addition, if the location of the point of contact of the short 80 is sufficiently close to point P1, then a low-resistance, or zero-resistance, path may exist between transistor 83 and ground. When transistor 83 conducts, a large current may be created, which may damage the transistor 83.

When this fault is detected, relay 60 is opened, as indicated in FIG. 6B. The motor becomes non-functional, and the short-circuit current IS terminates.

Alternately, the transistors 42 in FIG. 2 which feed the shorted coil 36 in FIG. 6 can be turned off, and the other two coils 30 and 33 can be used to generate a rotating stator field, to sustain rotation of the motor by appropriately adjusting the switching sequence.

FIGS. 7A and 7B illustrate situations wherein transistor 83, or transistor 89, become short-circuited. In either case, short-circuit current IS can be generated, causing the drag discussed above. When a shorted transistor is detected, relay 60 is opened, as indicated in FIG. 7C or FIG. 7D. The motor becomes non-functional, and the short-circuit current IS terminates. Alternatively, the switching sequence of the inverter may be altered to allow partial production of torque while preventing a direct short to ground through the affected leg of the inverter.

FIG. 8A illustrates situations wherein transistor 93, or transistor 99, become open-circuited. In either case, the relay 60 remains closed, as indicated, and the other phases are utilized to generate a rotating stator field as in FIG. 8B. In addition, since transistor 93A may be operational, it may be used to drive current in the direction of arrow 101 through coil 36. However, current in the opposite direction cannot flow, because transistor 99 is open. Thus, the net effect of the opening of transistor 99 is to prevent generation of current in coil 36 in the direction opposite arrow 101.

Figure 9:
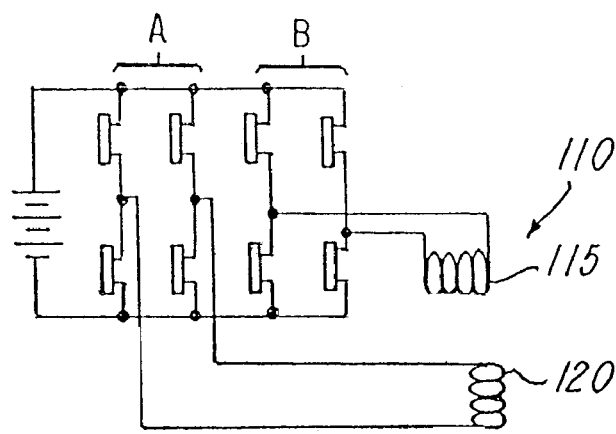
FIG. 9 is a schematic of the two coils 115 and 120 in a two-phase stator.

FIG. 9 is a schematic of stator coils 110 of a 2-phase motor. In one embodiment, the stator is of the synchronous type. Two H-bridges A and B control currents through coils 115 and 120.

Figure 10:
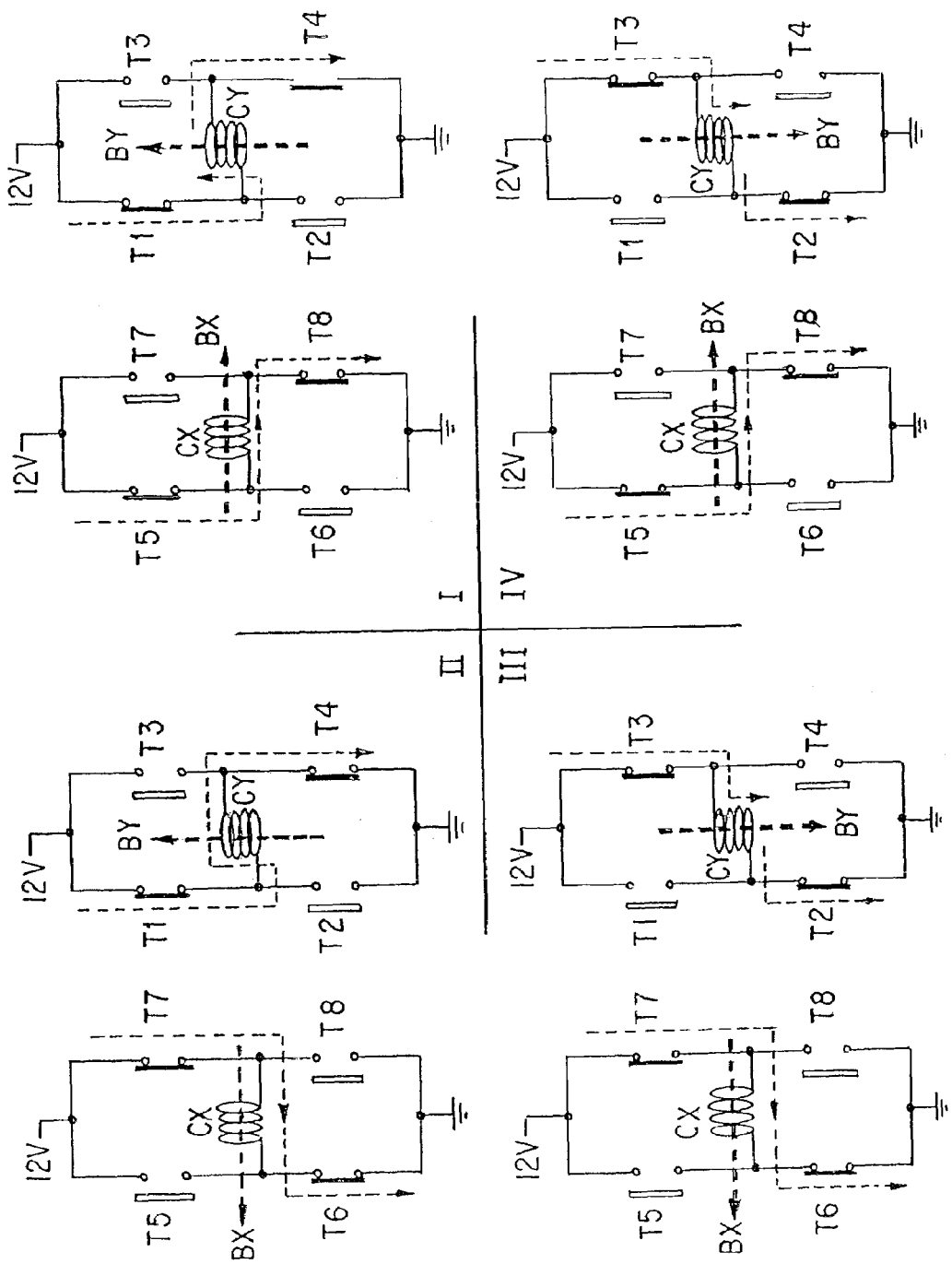
FIG. 10 illustrates two coils Cx and Cy, used in a two-phase electric motor, together with an H-bridge of transistors which delivers current to each coil.

FIG. 10 illustrates how the H-bridges A and B generate currents in coils Cx and Cy, in order to generate a rotating stator field. In quadrant I, coil Cx generates a magnetic field Bx pointing to the right, and coil Cy generates a magnetic field By pointing upward. The stator field generated (not shown) is the vector sum of Bx and By.

In quadrant II, coil Cx generates a magnetic field Bx pointing to the left, and coil Cy generates a magnetic field By pointing upward. The stator field generated (not shown) is the vector sum of Bx and By.

In quadrant III, coil Cx generates a magnetic field Bx pointing to the left, and coil Cy generates a magnetic field By pointing downward. The stator field generated (not shown) is the vector sum of Bx and By.

In quadrant IV, coil Cx generates a magnetic field Bx pointing to the right, and coil Cy generates a magnetic field By pointing downward. The stator field generated (not shown) is the vector sum of Bx and By.

The magnetic fields Bx and By are coordinated so that their vector sum is a stator field vector which rotates at a constant speed.

Figures 11A, 11B:
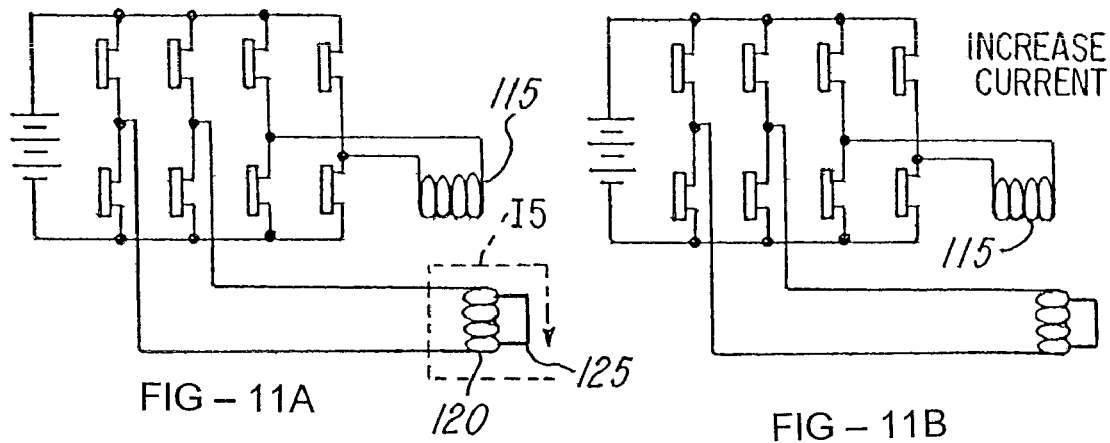
FIGS. 11A and 11B illustrate a short occurring in coil 120 of the two-phase stator, and a response taken to the short.

FIG. 11A illustrates a short 125 across coil 120. This short causes drag on the rotor, as discussed above. When the short 135 is detected, the invention increases the current in the other coil 115, as indicated in FIG. 11B. The Inventors have observed that, even though the magnetic field produced by coil 115 is always parallel with the x-axis, as shown in FIG. 10, nevertheless, that field will sustain rotation of the rotor (not shown).

In one embodiment, the current applied to coil 115 follows the function I(115)=COS (T), wherein COS refers to the cosine. The current applied to coil 120 follows the function I(120)=SIN(T), wherein SIN refers to the sine. These sinusoidal currents can be applied through Pulse Width Modulation, PWM, techniques, as known in the art.

The magnetic fields Bx and By will be nearly proportional to the currents, in the absence of saturation. Because coils 115 and 120 are orthogonal, these two fields Bx and By will sum to a stator vector which rotates about the center of the stator, as time T increases.

Under the fault condition of FIG. 11, the field By is present but oscillates with such a phase shift (in generating mode) that the resulting torque opposes the direction of rotation. The field Bx must be increased so that it dominates That field Bx either points in the positive x-direction, or the negative x-direction, and follows the time-function Bx=k COS(T), wherein k is a constant. As stated above, the current is increased in coil 115 after the fault, so that field Bx is larger than it was previously.

Even though the field Bx does not rotate, the Inventors have found that field Bx, by itself, will sustain rotation of the rotor. One reason can be explained by an example. Assume that Bx initially points to the east. The rotor field will rotate the rotor, attempting to align with Bx. Since the phase of current Cx is synchronized to the position of the rotor, as it reaches the alignment point the current Cx, and hence the field Bx, go to zero. At the instant that alignment is about to occur, two events happen.

One is that inertia of the rotating rotor carries the rotor past the alignment point with Bx. The second event is that field Bx changes in polarity by 180 degrees, and now points west. The rotor continues to rotate, now seeking to align with the west-pointing Bx. The two events just described repeat themselves, causing continued rotation.

If a situation should arise wherein (1) the rotor field is parallel with the field produced by coil Cx, and (2) the rotor is stationary, movement of the rotor can be initiated by movement of the steering wheel 130 in FIG. 1. The rotation induced by the two events described above can occur. Also, it is unlikely that the rotor field will be exactly parallel with the x-axis, with the result that the reversing field of coil Cx will probably induce rotation.

Figures 12A, 12B:
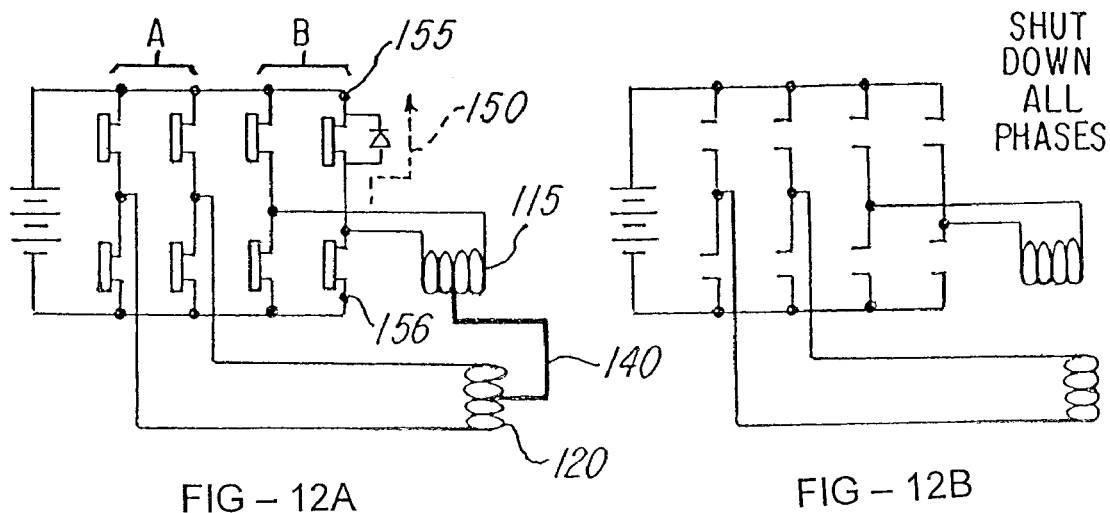
FIGS. 12A and 12B illustrate a short occurring between coils 120 and 115 of the two-phase stator, and a response taken to the short.

FIG. 12A illustrates a short 140 between coils 115 and 120. This short provides various current paths, depending on which transistors are closed at any given time. When this type of fault is detected, all phases are shut down, as indicated in FIG. 12B. That is, all transistors in the H-bridges A and B are opened, that is, turned off.

It is observed that, in one embodiment, a snubber diode, such as diode 145, can be provided in parallel with each transistor or the transistor may have an inherent body diode with the same electrical orientation. Those diodes provide a possible current path between the two phases, such as path 150, depending on the polarity of the voltage induced in the coils 115 and 120.

In one form of the invention, those possible current paths are not terminated by the invention. In this form, the current must return back through the battery in order to complete the circuit. Since it is not likely that the voltage induced in the coils will be sufficient for this to happen, these diodes have little effect on the motor operation. In another embodiment, the diodes are, in effect, removed from the circuit, as by opening a switches at point 155, at point 156, or both.

Figure 13:
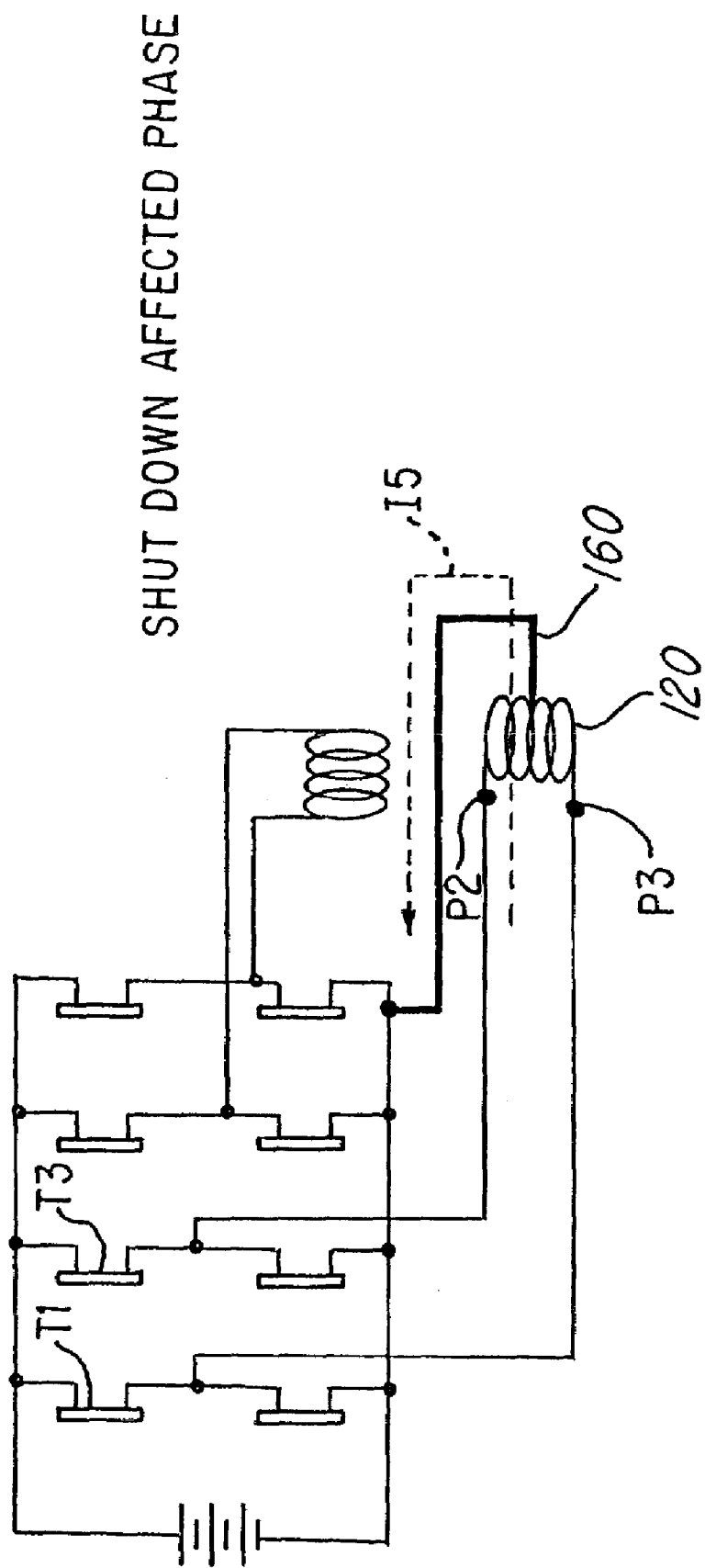
FIG. 13 illustrates a short occurring between coil 120 and ground of the two-phase stator, and a response taken to the short.

FIG. 13 illustrates a short 160 in coil 120, running to ground. This fault will cause a short-circuit current IS, depending on which transistors are closed at any given time, with resultant drag on the rotor, as discussed above. In addition, if the location of the point of contact of the short 160 is sufficiently close to point P2, then a low-resistance, or zero-resistance, path may exist between transistor T3 and ground. When transistor T3 conducts, a large current may be created, which may damage the transistor. A similar comment applies to transistor T1, if the point of contact of short 160 is sufficiently close to point P3.

When the short 160 is detected, the invention shuts down the affected phase coil 120 during quadrants wherein dangerous currents can flow. More than one approach is possible. In this particular example, the transistors below transistors T1 and T3 can be permanently opened, to prevent circulating currents. Transistors T1 and T3 operate normally: the motor operates with reduced performance and greater torque ripple. Of course, if the short is positioned so that transistor T1 or T3 faces a fault-to-ground, that transistor will be shut down.

The fault-detection system can, in effect, detect the relative closeness of the point of contact of short 160 to points P2 or P3. For example, if it is discovered that the current being passed by transistor T1 is much larger than that through T3, then it may be inferred that the point of contact is closer to point P3. Thus, transistor T1 may be opened, but transistor T3 remains operative. Thus, in FIG. 10, the conduction of coil Cy in quadrants III and IV would occur with current conducting through T3 and the short circuit, but not that shown in quadrants I and II so that a direct short circuit of the switch T1 does not occur.

Figure 14B:
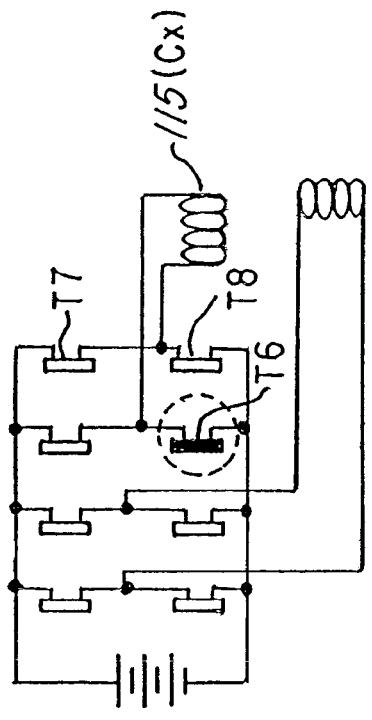
FIGS. 14A and 14B illustrate shorts occurring in transistors T5 and T6 in the H-bridges driving the coils of the two-phase stator, and a response taken to the shorts.
Figure 14A:
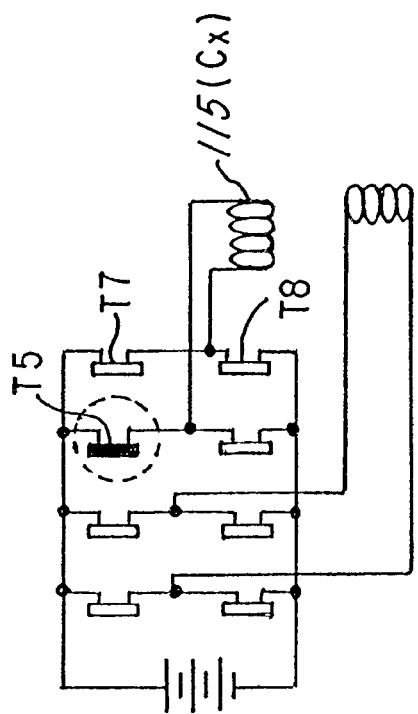

FIG. 14A illustrates transistor T5 as being shorted. FIG. 10 indicates that, under this condition, coil Cx (corresponding to coil 115 in FIG. 14) cannot produce the magnetic field Bx of quadrants II or III, because the upper-left transistor T5 feeding coil Cx in each of those quadrants is now short-circuited. The left side of coil Cx cannot be grounded.

However, coil Cx can still be powered using transistor T8 in FIG. 14, in quadrants I and IV in FIG. 10, and operation in those quadrants persists as usual. Thus, operation in the two quadrants where the shorted transistor must be opened is terminated. Restated, the affected coil, coil 115 in this example, is inoperative for 180 degrees every rotation.

In another embodiment, all operation of transistors T5 and T8 can be terminated in this fault condition.

FIG. 14B illustrates transistor T6 as being shorted. FIG. 10 indicates that, under this condition, coil Cx (corresponding to coil 115 in FIG. 14) cannot produce the magnetic field Bx of quadrants I or IV, because the lower-left transistor T6 in each of those quadrants is now short-circuited. The left side of coil Cx cannot be pulled to 12 volts.

However, coil Cx can still be powered by transistor T7 in FIG. 14, in quadrants II and III in FIG. 10, and operation in those quadrants persists as usual. Thus, again, operation in the two quadrants where the shorted transistor must be opened is terminated. Restated, the affected coil, coil 115 in this example, is inoperative for 180 degrees every rotation.

In another embodiment, all operation of transistors T6 and T7 can be terminated in this fault condition.

Figure 15B:
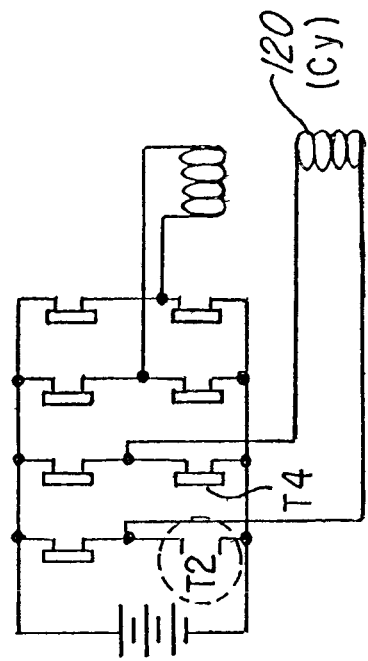
FIGS. 15A and 15B illustrate open circuits occurring in transistors T2 and T3 in the H-bridges driving the coils of the two-phase stator, and a response taken to the open circuits.
Figure 15A:
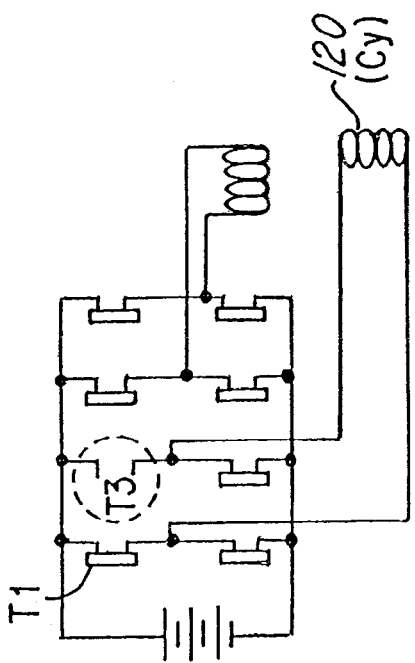

FIG. 15A illustrates transistor T3 as being open-circuited. FIG. 10 indicates that, under this condition, coil Cy (corresponding to coil 120 in FIG. 15) cannot produce a magnetic field By in quadrants III or IV, because the upper-right transistor T3 in each of those quadrants is now open-circuited. The right side of coil Cy cannot be connected to 12 volts.

However, coil Cy can still be powered by the mirror-image transistor T1 in FIG. 15, in quadrants I and II in FIG. 10, and operation in those quadrants persists as usual.

FIG. 15B illustrates transistor T2 as being open-circuited. FIG. 10 indicates that, under this condition, coil Cy (corresponding to coil 120 in FIG. 15) cannot produce a magnetic field By in quadrants III or IV. The left side of coil Cy cannot be connected to ground.

However, coil Cy can still be powered by the mirror-image transistor T4 in FIG. 14, in quadrants I and II in FIG. 10, and operation in those quadrants persists as usual.

It is of course recognized that the preceding discussion of FIGS. 14 and 15 only focused on faults in four transistors. The discussion applies to all eight transistors in the H-bridges A and B.

Figure 16:
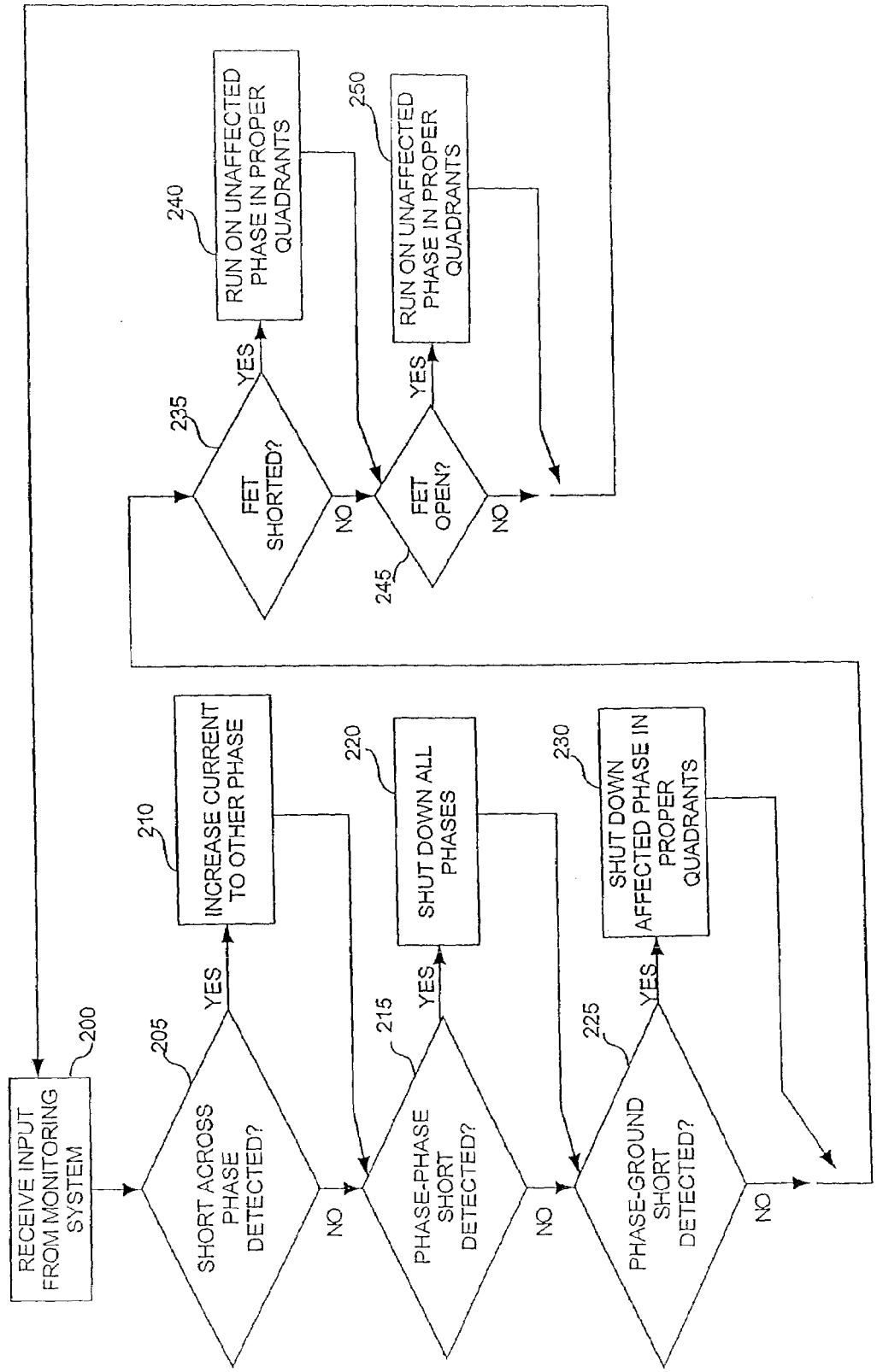
FIG. 16 is a flow chart illustrating processes undertaken by one form of the invention.

FIG. 16 is a flow chart illustrating processes undertaken by one form of the invention, using the hardware and software represented in FIG. 1. Block 200 in FIG. 16 indicates that fault data is received from a monitoring system 24, which measures selected voltages, currents, and other parameters in the circuit of FIG. 9, and other locations. Either the monitoring system 24, or the invention, utilizes the fault data to infer the presence of faults, such as the shorts, open-circuits, and short-circuits discussed above.

Block 205 inquires whether a short across a phase is detected, such as that of FIG. 11, left side. If so, the YES branch is taken in FIG. 16, wherein the current is increased to the other phase, and current to the shorted phase is terminated. If not, the NO branch is taken from inquiry block 205, and inquiry block 215 is reached, wherein inquiry is made whether a phase-phase short, as in FIG. 12, is detected. If so, the YES branch is taken, and block 220 shuts down all phases. If not, the NO branch is taken, and inquiry block 225 is reached.

Block 225 inquires whether a phase-ground short is detected, such as that of FIG. 13. If so, the NO branch is taken in FIG. 16, and block 230 is reached, wherein the affected phase is shut down in the proper quadrants, as discussed above. If not, the NO branch is taken, which leads to inquiry block 235. If the short to ground is near the middle of the phase, the measures discussed above can be taken. In the case of block 225, the short is probably at or near one end of the phase.

Block 235 inquires whether an FET is shorted, as shown in FIG. 14. If so, the YES branch is taken, and block 240 is reached, wherein the available phases are powered in the quadrants where available. If not, the NO branch is taken, and inquiry block 245 is reached.

Block 245 inquires whether an FET is open, as shown in FIG. 15. If so, the YES branch is taken, and block 250 is reached, wherein the available phases are powered in the quadrants where available. If not, the NO branch is taken, and the logic returns to block 200.

Additional Considerations

1. A two-phase motor is not merely a motor which contains two phases, but which contains no more than two phases which produce torque. Some motors contain stator coils which assist in commutation, and other functions largely unrelated to driving the rotor. The presence of such coils in a two-phase system does not change the two-phase nature of the motor.

From another perspective, a two-phase motor utilizes two spatially orthogonal coils to generate the rotating stator field.

2. One advantage of the 2-phase system described herein is that the relay 60 of FIGS. 3–9 is eliminated. This elimination provides several advantages. One is that the expense of the relay is eliminated, and the expense is not trivial because the relay is a high-current device, handling currents in the range of 100 Amps.

A second advantage is that the relay, being a mechanical device, has inherent reliability issues. A third is that the environment in which the relay resides creates its own reliability issues: for practical reasons, to reduce external wiring, the relay must be located within the motor. However, the internal temperatures in the motor can reach more than 125 C. Relays which are rated to operate at that temperature are difficult to find, and expensive when found.

A fourth advantage is that the relay is energized whenever the motor is operating, and thus consumes power. It may be thought that a normally closed relay could be used, but fail-safe considerations preclude this usage.

3. The magnetic field produced by coil 115 in FIG. 9 does not induce a significant voltage, if any voltage, in coil 120. Similarly, the magnetic field produced by coil 120 in FIG. 9 does not induce a significant voltage, if any voltage, in coil 115. The reason is that the fields (except for stray fields) are orthogonal to the planes of the windings in the coils.

As a consequence, there is no mutual coupling of the coils, unlike the 3-phase case, where coupling occurs.

Numerous substitutions and modifications can be undertaken without departing from the true spirit and scope of the invention. What is desired to be secured by Letters Patent is the invention as defined in the following claims.

The invention claimed is:

1. A method of operating a two-phase motor which provides power-assist in a vehicle, comprising the steps of:
  a) a two-phase electric motor to provide power assist in a steering system;
  b) detecting a short across one phase of the two-phase electric motor, and
  c) in response to the short, shutting off the shorted phase and running the two-phase electric motor solely on the other phase, to thereby continue power-assist, said two-phase electric motor providing power steering assist in said steering system.

2. The method according to claim 1, and further comprising:
  d) the step of increasing current to the other phase of said two-phase electric motor, or shutting down all phases to the motor.

3. A method of operating a motor vehicle, comprising the steps of:
  a) using a two-phase electric motor to provide power assist in a steering system;
  b) detecting predetermined faults in the motor if they occur and, in response, determining whether to maintain or terminate power assist, and then
    i) taking prescribed corrective action to maintain power assist, or
    ii) shutting down both phases, to terminate power assist.

4. A method of operating a two-phase electric motor, comprising the steps of:
  a) providing a two-phase electric motor to provide power assist in a steering system of a vehicle;
  b) inferring occurrence of a short across one phase of said two-phase electric motor; and
  c) in response, increasing current to the other phase of said two-phase electric motor.

5. A method of operating a two-phase electric motor, comprising the steps of:
  a) providing a two-phase electric motor to provide power assist in a steering system;
  b) inferring occurrence of a short between the two phases of said two-phase electric motor; and
  c) in response, shutting down all phases of said two-phase electric motor.

6. A method of operating a two-phase electric motor, comprising the steps of:
  a) inferring occurrence of a short between one phase and ground; and
  b) in response, shutting said one phase during selected quadrants of operation.

7. A method of operating a two-phase electric motor, comprising the steps of:
  a) inferring occurrence of a short in a transistor feeding an affected phase; and
  b) in response, delivering power to the phases only in selected quadrants of operation.

8. A method of operating a two-phase electric motor, comprising the steps of:
  a) inferring occurrence of an open-circuited transistor connected to an affected phase; and
  b) in response, delivering power to the phases only in selected quadrants of operation.

9. A method of operating a two-phase electric motor, comprising the steps of:
  a) examining fault data produced by a fault-monitoring system and taking the following actions:
    i) if the fault data indicates a short across one phase, then increasing current to the other phase;
    ii) if the fault data indicates a short between the two phases, then shutting down all phases;
    iii) if the fault data indicates a short between one phase and ground, then shutting said one phase during selected quadrants of operation;
    iv) if the fault data indicates a short in a transistor feeding a phase, then delivering power to the phases only in selected quadrants of operation; and
    v) if the fault data indicates an open-circuited transistor feeding a phase, then delivering power to the phases only in selected quadrants of operation.

10. The method according to claim 4, wherein the two-phase electric motor is located in a vehicle, and provides power assist to a steering system.

11. The method according to claim 5, wherein the two-phase electric motor is located in a vehicle, and provides power assist to a steering system.

12. A method of operating a two-phase electric motor, comprising:
   a) inferring occurrence of a short between one phase and ground; and
   b) in response, shutting said one phase during selected quadrants of operation, wherein the electric motor is located in a vehicle, and provides power assist to a steering system.

13. A method of operating a two-phase electric motor, comprising:
   a) inferring occurrence of a short in a transistor feeding an affected phase; and
   b) in response, delivering power to the phases only in selected quadrants of operation, wherein the electric motor is located in a vehicle, and provides power assist to a steering system.

14. A method of operating a two-phase electric motor, comprising:
   a) inferring occurrence of an open-circuited transistor connected to an affected phase; and
   b) in response, delivering power to the phases only in selected quadrants of operation, wherein the electric motor is located in a vehicle, and provides power assist to a steering system.

15. A method of operating a two-phase electric motor, comprising:
   a) examining fault data produced by a fault-monitoring system and taking the following actions:
      i) if the fault data indicates a short across one phase, then increasing current to the other phase;
      ii) if the fault data indicates a short between the two phases, then shutting down all phases;
      iii) if the fault data indicates a short between one phase and ground, then shutting said one phase during selected quadrants of operation;
      iv) if the fault data indicates a short in a transistor feeding a phase, then delivering power to the phases only in selected quadrants of operation; and
      v) if the fault data indicates an open-circuited transistor feeding a phase, then delivering power to the phases only in selected quadrants of operation, wherein the electric motor is located in a vehicle, and provides power assist to a steering system.

16. A system, comprising:
   a) a two-phase electric motor, containing phases A and B in a stator of the synchronous type;
   b) an H-bridge A, which
      i) delivers current to phase A, and
      ii) contains four switches;
   c) an H-bridge B, which
      i) delivers current to phase B, and
      ii) contains four switches;
   d) a control system which
      i) controls H-bridges A and B;
      ii) receives fault data from a diagnostic system;
      iii) if the fault data indicates presence of a predetermined fault, then shutting off prescribed transistors in the H-bridges.

17. A system, comprising:
   a) a two-phase electric motor, containing phases A and B in a stator of the synchronous type;
   b) an H-bridge A, which
      i) delivers current to phase A, and
      ii) contains four switches;
   c) an H-bridge B, which
      i) delivers current to phase B, and
      ii) contains four switches;
   d) a control system which
      i) controls H-bridges A and B;
      ii) receives fault data from a diagnostic system;
      iii) if the fault data indicates presence of a predetermined fault, then shutting off prescribed transistors in the H-bridges, wherein the motor is contained in a vehicle, and further comprising:
         a) a linkage between the motor and steerable wheels of the vehicle, which enables the motor to provide power to steer the wheels.

18. A power steering assist system, comprising:
   a) a vehicle;
   b) a two-phase motor which provides power steering assist in said vehicle:
   c) means for
      i) detecting a short across one phase of the steering motor; and
      ii) in response to the short, shutting off the shorted phase and running the two-phase electric motor solely on the other phase, to thereby continue power assist to steering in said vehicle.

19. The power steering assist system according to claim 18, and further comprising:
   d) means for increasing current to said other phase.

20. A motor vehicle having a power steering system, said motor vehicle comprising:
   a) a power steering system comprising a two-phase electric motor which provides power steering assist in said power steering system;
   b) means for detecting predetermined faults in the two-phase electric motor if they occur and, in response,
      i) controlling a current to the two-phases of said electric motor to maintain power steering assist, or
      ii) shutting down both phases, to terminate power steering assist.

21. A motor vehicle power steering system, comprising:
   a) a two-phase electric motor to provide power steering assist in said power steering system;
   b) means for
      i) inferring occurrence of a short across one phase of said two-phase electric motor; and
      ii) in response, increasing current to the other phase.

22. A motor vehicle power steering system, comprising:
   a) a two-phase electric motor to provide power steering assist in said power steering system;
   b) means for
      i) inferring occurrence of a short between the two phases of said two-phase electric motor; and
      ii) in response, shutting down all phases of said two-phase electric motor.

23. A system, comprising:
   a) a two-phase electric motor;
   b) means for
      i) inferring occurrence of a short between one phase and ground; and
      ii) in response, shutting said one phase during selected quadrants of operation.

24. A system, comprising:
   a) a two-phase electric motor;
   b) means for
      i) inferring occurrence of a short in a transistor feeding an affected phase; and
      ii) in response, delivering power to the phases only in selected quadrants of operation.

25. A system, comprising:
a) a two-phase electric motor;
b) means for
   i) inferring occurrence of an open-circuited transistor feeding an affected phase; and
   ii) in response, delivering power to the phases only in selected quadrants of operation.

26. A system, comprising:
a) a two-phase electric motor;
b) means for examining fault data produced by a fault-monitoring system and taking the following actions:
   i) if the fault data indicates a short across one phase, then increasing current to the other phase;
   ii) if the fault data indicates a short between the two phases, then shutting down all phases;
   iii) if the fault data indicates a short between one phase and ground, then shutting said one phase during selected quadrants of operation;
   iv) if the fault data indicates a short in a transistor feeding a phase, then delivering power to the phases only in selected quadrants of operation; and
   v) if the fault data indicates an open-circuited transistor feeding a phase, then delivering power to the phases only in selected quadrants of operation.

27. The system according to claim 16, wherein the electric motor is located in a vehicle and provides power assist to a steering system.

28. The power steering assist system according to claim 18, wherein the electric motor is located in a vehicle, and provides power assist to a steering system.

29. The motor vehicle power steering system according to claim 21, wherein the electric motor is located in a vehicle, and provides power assist to a steering system.

30. The motor vehicle power steering system according to claim 22, wherein the electric motor is located in a vehicle, and provides power assist to a steering system.

31. The system according to claim 23, wherein the electric motor is located in a vehicle, and provides power assist to a steering system.

32. The system according to claim 24, wherein the electric motor is located in a vehicle, and provides power assist to a steering system.

33. The power steering assist system according to claim 18, wherein the means includes a microprocessor and a program which runs on the microprocessor.

34. The power steering assist system according to claim 19, wherein the means includes a microprocessor and a program which runs on the microprocessor.

35. The motor vehicle according to claim 20, wherein the means includes a microprocessor and a program which runs on the microprocessor.

36. The motor vehicle power steering system according to claim 21, wherein the means includes a microprocessor and a program which runs on the microprocessor.

37. The motor vehicle power steering system according to claim 22, wherein the means includes a microprocessor and a program which runs on the microprocessor.

38. A system, comprising:
a) a two-phase electric motor;
b) means for
   i) inferring occurrence of a short between one phase and ground; and
   ii) in response, shutting said one phase during selected quadrants of operation, wherein the means includes a microprocessor and a program which runs on the microprocessor.

39. A system, comprising:
a) a two-phase electric motor;
b) means for
   i) inferring occurrence of a short in a transistor feeding an affected phase; and
   ii) in response, delivering power to the phases only in selected quadrants of operation, wherein the means includes a microprocessor and a program which runs on the microprocessor.

40. A system, comprising:
a) a two-phase electric motor;
b) means for
   i) inferring occurrence of an open-circuited transistor feeding an affected phase; and
   ii) in response, delivering power to the phases only in selected quadrants of operation, wherein the means includes a microprocessor and a program which runs on the microprocessor.

41. A system, comprising:
a) a two-phase electric motor;
b) means for examining fault data produced by a fault-monitoring system and taking the following actions:
   i) if the fault data indicates a short across one phase, then increasing current to the other phase;
   ii) if the fault data indicates a short between the two phases, then shutting down all phases;
   iii) if the fault data indicates a short between one phase and ground, then shutting said one phase during selected quadrants of operation;
   iv) if the fault data indicates a short in a transistor feeding a phase, then delivering power to the phases only in selected quadrants of operation; and
   v) if the fault data indicates an open-circuited transistor feeding a phase, then delivering power to the phases only in selected quadrants of operation, wherein the means includes a microprocessor and a program which runs on the microprocessor.

* * * * *